(12) United States Patent
Tao et al.

(10) Patent No.: US 9,012,570 B2
(45) Date of Patent: Apr. 21, 2015

(54) CONTINUOUS PRODUCTION OF POLY(VINYL BUTYRAL)

(75) Inventors: Ling Tao, Lakewood, CO (US); Pol D'Haene, Kessel-Lo (BE); Philippe Moniotte, Heron (BE); Paul Van Lierde, Haacht (BE)

(73) Assignee: Eastman Chemical Company, Kingsport, TN (US)

( * ) Notice: Subject to any disclaimer, the term of this patent is extended or adjusted under 35 U.S.C. 154(b) by 585 days.

(21) Appl. No.: 12/426,246

(22) Filed: Apr. 18, 2009

(65) Prior Publication Data
US 2010/0267921 A1    Oct. 21, 2010

(51) Int. Cl.
*C08F 8/00* (2006.01)
*C08G 63/91* (2006.01)
*C08F 8/28* (2006.01)

(52) U.S. Cl.
CPC ....................................... *C08F 8/28* (2013.01)

(58) Field of Classification Search
CPC .............. C08F 8/00; C08F 8/28; C08F 16/00; C08F 16/06
USPC .................................................... 525/61, 56
See application file for complete search history.

(56) References Cited

U.S. PATENT DOCUMENTS

| 2,422,754 | A | 6/1947 | Stamatoff |
| 2,457,261 | A * | 12/1948 | Morrison et al. ............. 525/61 |
| 2,720,501 | A | 10/1955 | Van Ness |
| 3,153,009 | A | 10/1964 | Rombach |
| 5,137,954 | A * | 8/1992 | DasGupta et al. ............. 524/284 |
| 5,238,994 | A * | 8/1993 | Reejhsinghani ................ 525/57 |
| 5,349,014 | A | 9/1994 | Degeilh |
| 5,866,654 | A | 2/1999 | Fuss |
| 6,347,934 | B1 * | 2/2002 | Andersen et al. ............. 425/557 |
| 6,528,025 | B1 | 3/2003 | Boesch |
| 7,351,765 | B2 | 4/2008 | Stark |
| 7,385,005 | B2 | 6/2008 | Mashiko |

FOREIGN PATENT DOCUMENTS

| CN | 1278268 A | 12/2000 |
| GB | 2127834 A | 4/1984 |
| JP | 5-097918 A | 4/1993 |

OTHER PUBLICATIONS

A.E. Akopyan, V.E. Badalyn, and D.Kh. Sarkisyan, Continuous Process for Production of Adhesive Polyvinyl Butyral, Zh. Prikl. Khim., 1964, 37, 7, 1601-5, S. Petersburg, Russ, Fe, 1964.

A.E. Akopyan, V.E. Badalyn, and D.Kh. Sarkisyan, Continuous Washing of Polyvinyl Butyral, Armyansk Khim Zh., 1966, 19, 4, 32-15, 1966.

Romankov, P.G., Rashkovskaya, N.B., Sinel'Nikova, L.L., Drying of Polymers in a Fluidized Bed and y the Air-Blow Method, Khim. Prom., (1963), (11),841-3 (English Abstract), 1963.

* cited by examiner

*Primary Examiner* — David W Wu
*Assistant Examiner* — Marie Reddick
(74) *Attorney, Agent, or Firm* — Michelle Bugbee

(57) ABSTRACT

The present invention provides a method for continuously producing poly(vinyl butyral) in which the acetalization of poly(vinyl butyral) is carried out using a poly(vinyl alcohol) varnish provided to a mixing region of a high shear mixer at an elevated temperature, which reduces the amount of energy required compared to conventional processing because at least one cooling and heating cycle is eliminated, or makes the recuperation of energy more straightforward.

17 Claims, No Drawings

CONTINUOUS PRODUCTION OF POLY(VINYL BUTYRAL)

FIELD OF THE INVENTION

The present invention is in the field of poly(vinyl butyral) production, and, specifically, the present invention is in the field of poly(vinyl butyral) production utilizing continuous production techniques.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a poly(vinyl butyral) sheet disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area.

Poly(vinyl butyral) is commonly produced using a conventional batch process that, like most batch processes, requires repeated cycles of reactant addition, mixing, emptying, and cleaning. One conventional method can require over a four hour batch cycle time.

While the production of poly(vinyl butyral) using a continuous method has been attempted, those conventional attempts have often produced less than satisfactory results, including, for example, resin having inconsistent poly(vinyl butyral) composition and processes that, due to mixer constraints, produce poly(vinyl butyral) containing undesirable agglomerations.

Accordingly, further improved methods are needed to produce poly(vinyl butyral) using a continuous process that is efficient, scalable, and that produces poly(vinyl butyral) of consistently high quality.

SUMMARY OF THE INVENTION

The present invention provides a method for continuously producing poly(vinyl butyral) in which the acetalization of poly(vinyl butyral) is carried out using a poly(vinyl alcohol) varnish provided to a mixing region of a high shear mixer at an elevated temperature, which reduces the amount of energy required compared to conventional processing because at least one cooling and heating cycle is eliminated, or makes the recuperation of energy more straightforward.

DETAILED DESCRIPTION

The present invention provides a poly(vinyl butyral) manufacturing process for the continuous production of poly(vinyl butyral) resin by using a high shear mixer and high processing temperatures, which provide a more cost effective, efficient, and adaptable production system compared to conventional batch processes.

Conventional batch production of poly(vinyl butyral) typically begins with the dissolution of poly(vinyl alcohol) in a solvent, which can be, for example, water. Solution temperatures are typically brought to about 90° C. in order to ensure that the poly(vinyl alcohol) solution is completely dissolved, after which the solution is cooled to below room temperature and reacted with butyraldehyde in the presence of an acid catalyst to form poly(vinyl butyral). The poly(vinyl butyral) mixture that is formed is then further heated prior to washing to form a final product. That process is both time consuming and energy intensive.

Methods of the present invention simplify the process by reacting a heated, continuous stream of poly(vinyl alcohol) directly with a continuous stream of butyraldehyde within a region of a high shear mixer, thereby eliminating the cooling and reheating steps that are common in the batch process, as well as reducing energy costs and manufacturing time.

In various embodiments of the present invention, the poly(vinyl alcohol) stream, which is poly(vinyl alcohol) that has been dissolved in a suitable solvent, and preferably water, is either heated prior to entering the high shear mixer, as would be the case if the poly(vinyl alcohol) dissolution step is carried out immediately before mixing, or is heated upon entering the mixer. The later embodiment, for example, can be employed if a poly(vinyl alcohol) solution cools between initial dissolution and introduction into the high shear mixer. In either case, the heated poly(vinyl alcohol) stream is mixed with a continuous stream of butyraldehyde in a mixing region of the high shear mixer. An acid catalyst is introduced either before this mixing occurs, as this mixing occurs, or after mixing has already begun but before it is complete. In a screw type high shear mixer, for example, a port for introducing the acid catalyst to the mixing region or to one of the continuous streams can be provided. The combination of the poly(vinyl alcohol) stream, the butyraldehyde stream, and the acid catalyst, along with the high shear mixing, results in the formation of poly(vinyl butyral) resin, which can then be extruded, washed, and dried to form an easily handled, dry form of poly(vinyl butyral) resin.

As used herein, a "high shear mixer" includes any mixer that is capable of introducing the poly(vinyl alcohol) and butyraldehyde streams into a region where a shear rate of at least $20\ s^{-1}$, $30\ s^{-1}$, or $40\ s^{-1}$, or $20\ s^{-1}$ to $400\ s^{-1}$, $20\ s^{-1}$ to $300\ s^{-1}$, or $20\ s^{-1}$ to $200\ s^{-1}$ can be applied for a duration of at least 20, 30, or 40 seconds, or 20 to 500 seconds, 20 to 200 seconds, or 20 to 100 seconds. In various embodiments of the present invention, a shear force of at least 20, 30, or 40 Pascals, or 20 to 400, 20 to 300, or 20 to 200 Pascals is applied. After high sheer mixing, the particle size can be 50 to 200 micros, 60 to 150 microns, or 80 to 120 microns.

High shear mixers of the present invention include screw extruders, twin screw extruders, in-line mixers (examples include Typhoon® mixers), disintegrators (examples include IKA or Silverson mixers), static mixers (examples include Kenics or Sulzer mixers), and any other device in which a high shear flow field can be combined with a sufficiently long residence time, and preferably combined in a plug flow type flow regime. High shear mixers of the present invention are capable of continuous production, meaning they are capable of receiving continuous input streams of reactants while also continuously discharging the product of the reaction.

The concentration of butyraldehyde can be 90.0% to 99.9%, 95.0 to 99.9%, or 99.0% to 99.9%. The concentration of the poly(vinyl alcohol) varnish can be 5% to 20%, 8.0% to 18.0%, or 10.0% to 15.0%.

In various embodiments of the methods of the present invention, the temperature of the stream of poly(vinyl alcohol) can be greater than 95° C., 105° C., or 115° C., or 120° C. to 160° C., 110° C. to 170° C., or 120° C. to 160° C., and, as noted, the temperature can be set before or after the poly(vinyl alcohol) stream has been introduced into the high shear mixer. Poly(vinyl alcohol) of the present invention can be derived from any suitable source, and, as described in detail below, in various embodiments the poly(vinyl alcohol) is derived from poly(vinyl acetate) that has been hydrolyzed.

Butyraldehyde is added to the high shear mixer, preferably in a liquid form. Its temperature can range from 0° C. to 70° C., or higher when introduced under pressure, and it can be kept at about room temperature.

The poly(vinyl alcohol) stream is directed to a region of the high shear mixer, which is referred to herein as the "mixing region" of the high shear mixer, in which mixing with a continuous butyraldehyde stream and an acid catalyst will occur. In various embodiments, the temperature of the mixing region is set to be equivalent to the temperature of the incoming poly(vinyl alcohol) stream, or within 10% or 20% of that value.

The acetalization reaction occurs in the presence of acids, acting as a catalyst, in a concentration range, for example between 0.1% and 5% by weight, preferably between 0.2% and 2.0% by weight, based on the aqueous poly(vinyl alcohol) phase. Suitable acids and mixtures thereof are strong mineral acids such as HCl, $H_2SO_4$, $HNO_3$, $HClO_4$, $H_3PO_4$, and other, as well as aromatic and aliphatic sulfuric acids. The temperature of the acid can range between 20° C. and 100° C., and is preferably within 10 degrees Celsius or exactly equal to the temperature of the poly(vinyl alcohol) solution. In various embodiments of the present invention, the acid catalyst is an inorganic acid, and, in preferred embodiments, the acid catalyst is nitric acid.

The amount of butyraldehyde that is added can be 0.25 kg to 1.5 kg or 0.50 kg to 0.75 kg for each 1 kg of pure poly(vinyl alcohol) added.

In some embodiments, two distinct mixing regions are included in the high shear mixer. In a first mixing region, the poly(vinyl alcohol) and butyraldehyde are mixed in a high shear region. In the first mixing region the shear rate ranges from 20 $s^{-1}$ to 10,000 $s^{-1}$, from 50 and 5000 $s^{-1}$, or from 100 and 500 $s^{-1}$. The residence time of the material in this first mixing region can be between 10 seconds and 60 minutes, 30 seconds and 30 minutes, or 60 seconds and 10 minutes. In a second mixing region, the shear rate can be decreased to values from 1 $s^{-1}$ and 500 $s^{-1}$ or from 5 and 50 $s^{-1}$. The residence time in the second mixing region can be 10 to 180 minutes or 20 to 60 minutes. The temperature in each mixing region can be the same or different in these embodiments. The temperature in the first mixing region can be 10° C. to 120° C. or from 40° C. to 100° C. The temperature in the second mixing region can be 10° C. and 120° C. or 60° C. to 120° C.

After mixing, poly(vinyl butyral) resin is discharged from the mixing region as a slurry, which can be neutralized, washed, and dried, as desired, to put the poly(vinyl butyral) in a dry form that is easily handled and shipped as a poly(vinyl butyral) resin.

As used herein, "processing said poly(vinyl butyral) resin from said high sheer mixer" means using any suitable means to cause the poly(vinyl butyral) resin to be removed from the high sheer mixer, including, for example, but not limited to, forcing the resin out of the mixer using mixer pressure or external pressure, among others.

The purpose of the washing process is to extract the non-reacted butyraldehyde as well as the remains of the acid catalyst. Washing can be carried out in a continuous countercurrent washing process, preferably using water as the extraction liquid. Subsequently the particles are separated from the mother liquor, by, for example, a continuous filtration process or by centrifugation. Finally the poly(vinyl butyral) particles can be dried using a continuous drying process such as fluidized bed drying, circulating fluidized bed drying, flash drying, or any other process that allows continuous processing and transport of the powders.

Various additives can be added to the poly(vinyl butyral) resin during the above-described mixing process. These can be surfactants to help control the size distribution of the particles and to counteract excessive agglomeration of the particles (see U.S. Pat. No. 5,238,994) or long chain aldehydes to form longer chain acetal groups on the polymer backbone, which could serve as internal plasticization (see U.S. Pat. No. 5,594,069).

The poly(vinyl butyral) resin produced by the continuous process of the present invention can be, after formation of the resin in the mixing region of the high shear mixer, amended in the same continuous process with further additives and plasticizers and formed into pellets that can be easily stored and handled, as described in detail in U.S. Pat. No. 7,491,761.

Poly(vinyl butyral) formed by the methods of the present invention can be formed into any article for which it is suitable. In one common application poly(vinyl butyral) is used for the production of polymer sheets for use in, for example, automobile and architectural safety glass and photovoltaic modules.

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels.

The present invention includes, in addition to the methods described herein, the polymer resin made by the inventive process and any articles made therefrom, including poly(vinyl butyral) sheets and laminated glazings and photovoltaic modules made from the resin or the sheet.

Details for the various parameters of the reactants of the methods of the present invention are detailed in U.S. Pat. Nos. 2,282,057 and 2,282,026 and in Vinyl Acetal Polymers, in Encyclopedia of Polymer Science & Technology, $3^{rd}$ edition, Volume 8, pages 381-399, by B. E. Wade (2003).

In various embodiments, the poly(vinyl butyral) resin produced by the methods of the present invention comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The poly(vinyl butyral) resin can also comprise less than 15 wt. % residual ester groups, 13 wt. %, 11 wt. %, 9 wt. %, 7 wt. %, 5 wt. %, or less than 3 wt. % residual ester groups calculated as poly (vinyl acetate), with the balance being an acetal, preferably butyraldehyde acetal, but optionally including other acetal groups in a minor amount, e.g., a 2-ethyl hexanal group (see, for example, U.S. Pat. No. 5,137,954).

In various embodiments the poly(vinyl butyral) produced can have a molecular weight of at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350,000 g/mole (see, for example, U.S. Pat. Nos. 4,902,464; 4,874,814; 4,814,529; and, 4,654,179). As used herein, the term "molecular weight" means the weight average molecular weight.

Various adhesion control agents can be added to the poly (vinyl butyral) of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate) and magnesium bis (2-ethyl hexanoate).

Other additives may be incorporated into the poly(vinyl butyral) to enhance its performance in a final product. Such additives include, but are not limited to, dyes, pigments, stabilizers (e.g., ultraviolet stabilizers), antioxidants, IR absorbers, flame retardants, combinations of the foregoing additives, and the like, as are known in the art.

Any suitable plasticizers can be added to the poly(vinyl butyral) resins of the present invention. Plasticizers can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779. and $C_6$ to $C_8$ adipate esters, such as hexyl adipate. In various embodiments, the plasticizer used is dihexyl adipate and/or triethylene glycol di-2 ethylhexanoate.

In various embodiments of the present invention, poly(vinyl butyral) that has been mixed with plasticizer, for example in sheet or pellet form, can comprise 20 to 60, 25 to 60, 20 to 80, 10 to 70, or 10 to 100 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) product. In general, higher amounts of plasticizer are added to decrease the $T_g$. Poly(vinyl butyral) polymer sheets of the present invention, for example, can have a $T_g$ of 40° C. or less, 35° C. or less, 30° C. or less, 25° C. or less, 20° C. or less, and 15° C. or less.

Any suitable method can be used to produce polymer sheets of the present invention from resins of the present invention. One exemplary method of forming a poly(vinyl butyral) sheet comprises extruding molten poly(vinyl butyral) comprising resin, plasticizer, and additives by forcing the melt through a die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In various embodiments, the polymer sheets can have thicknesses of, for example, 0.1 to 2.5 millimeters, 0.2 to 2.0 millimeters, 0.25 to 1.75 millimeters, and 0.3 to 1.5 millimeters.

A reactor system may be positioned after the high shear mixer. The reactor system can be any type of device that allows a continuous flow of slurry through the system that provides sufficient shear and that can sufficiently control temperature. Examples are plug flow reactors, such as an oscillating pipe reactor, a series of static (for example, Kenics®) mixers connected to one another to provide a sufficiently long residence time, or a multiple chamber mixer that has adjacent chambers, each with an agitator, where the poly (vinyl butyral) is alternatingly passed to each chamber in a port on the bottom of a chamber and a port on the top of a chamber. A continuous stirred tank reactor can also be effectively employed.

EXAMPLE

A poly(vinyl alcohol) solution in water at a concentration of 11.4 w/w %, is pumped continuously in a Typhoon® in-line mixer (Typhoon® HSI-4; rotational speed=2,650 RPM). During the experiment, the temperature of the poly (vinyl alcohol) solution ranges between 100° C. and 105° C. In order to attain a homogeneous acid—poly(vinyl alcohol) solution mixture, the acid catalyst is added prior to reaction to the poly (vinyl alcohol) solution in a Kenics® mixer, positioned in front of the entrance of the Typhoon® reactor. Butyraldehyde is added to this acid—poly(vinyl alcohol) solution in the Typhoons® mixer itself. The respective flow rates of the different reactants are as follows: poly(vinyl alcohol) varnish=1,000 grams per minute; nitric acid solution (15%)=87 grams per minute; butyraldehyde=63 grams per minute.

From the Typhoon® the slurry formed is pumped into a hold tank for finalizing the high temperature reaction. The continuous precipitation reaction is carried out for approximately 25 minutes until the poly(vinyl alcohol) solution is consumed. After the high shear mixer the particle size ranges between 80 and 120 microns, and the residual hydroxyl content is approximately 25%. Further growth of the particle size is noted in the hold tank until approximately 350 micron, depending on the rotational speed of the hold tank agitator. In the hold tank, the hydroxyl content is further reduced to approximately 20%.

By virtue of the present invention, it is now possible to continuously produce high quality poly(vinyl butyral) resin that can be used in any convention poly(vinyl butyral) application.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout, thereby forming many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A method of manufacturing a poly(vinyl butyral) resin, the method comprising:
    providing a high shear mixer;
    adding a continuous stream of poly(vinyl alcohol) to said high shear mixer;
    adding a continuous stream of butyraldehyde to said high shear mixer;
    mixing said stream of poly(vinyl alcohol) and said stream of butyraldehyde in a region of said high shear mixer wherein said streams are mixed at an overall average shear rate of at least 20 s$^{-1}$, wherein said stream of poly(vinyl alcohol) is at a temperature of greater than 95° C. to form said poly(vinyl butyral) resin; and, processing said poly(vinyl butyral) resin from said high shear mixer.

2. The method of claim 1, wherein said poly(vinyl alcohol) stream is at a temperature greater than 115° C.

3. The method of claim 1, wherein said poly(vinyl alcohol) stream is at a temperature of 110° C. to 170° C.

4. The method of claim 1, wherein said poly(vinyl alcohol) stream is at a temperature of 120° C. to 160° C.

5. The method of claim 1, further including adding a continuous stream of water prior to or during said mixing.

6. The method of claim 1, wherein said high shear mixer imparts an average shear force of at least 20 Pascals.

7. The method of claim 1, wherein said high shear mixer imparts an average shear force of at least 30 Pascals.

8. The method of claim 1, wherein said high shear mixer imparts an average shear force of at least 40 Pascals.

9. The method of claim 1, further including the step of adding an acid catalyst prior to or during said mixing.

10. The method of claim 9, wherein said acid catalyst is an inorganic acid.

11. The method of claim 1, wherein said mixing occurs in less than five minutes.

12. The method of claim 1, wherein said mixing occurs in less than three minutes.

13. The method of claim 1, further comprising passing said poly(vinyl butyral) resin through a continuously mixed reactor system positioned after the high shear mixer.

14. The method of claim 1, further comprising washing said poly(vinyl butyral) resin.

15. The method of claim 1, wherein said overall mixing is at an average shear rate of at least 30 s$^{-1}$.

16. The method of claim 1, wherein said overall mixing is at an average shear rate of at least 40 s$^{-1}$.

17. A method of manufacturing a poly(vinyl butyral) resin, comprising the steps: providing a high shear mixer;
    adding a continuous stream of poly(vinyl alcohol) to said high shear mixer;
    adding a continuous stream of butyraldehyde to said high shear mixer;
    mixing said stream of poly(vinyl alcohol) and said stream of butyraldehyde in a region of said high shear mixer wherein said streams are mixed at an overall average shear rate of at least 20 s$^{-1}$, wherein said stream of poly(vinyl alcohol) is at a temperature of greater than 105° C. to form said poly(vinyl butyral) resin; and,
    processing said poly(vinyl butyral) resin from said high shear mixer.

* * * * *